Sept. 1, 1936.  C. E. HATHORN  2,053,078
ENGINE MOUNT
Filed April 12, 1934  2 Sheets-Sheet 1

INVENTOR.
CHARLES E. HATHORN.
BY
ATTORNEYS.

Sept. 1, 1936.  C. E. HATHORN  2,053,078
ENGINE MOUNT
Filed April 12, 1934  2 Sheets-Sheet 2

INVENTOR.
CHARLES E. HATHORN.
BY
ATTORNEYS.

Patented Sept. 1, 1936

2,053,078

UNITED STATES PATENT OFFICE 2,053,078

ENGINE MOUNT

Charles E. Hathorn, Kenmore, N. Y., assignor to Curtiss Aeroplane & Motor Company, Inc., a corporation of New York Application April 12, 1934, Serial No. 720,185

5 Claims. (Cl. 248—5)

This invention relates to aircraft, and is particularly concerned with improvements in mounting arrangements for engines therein.

Past practice in the mounting of aircraft power plants may be briefly summarized as follows, whereby a better understanding of the improvements in this invention may be attained.

Engines of the in-line type have been provided with longitudinally spaced mounting lugs on either side of the engine, which lugs are bolted to a longitudinally extending engine bed comprising a pair of laterally spaced stringers which are adequately braced to the airplane structure. By this mounting, the longitudinally extending stringers embrace a considerable portion of the engine forwardly and rearwardly of the center of gravity thereof, whereby movement of the engine due to its operation is well restrained and such movement or vibration is transmitted to the aircraft body in its more or less simple and original magnitude. However, since the more recent popularity of radial aircraft engines, mounting means for such engines have usually comprised a motor mount structure extending from the aircraft body provided at its forward end with a mounting ring. The engine is provided with mounting lugs toward the rearward end of the main crankcase, these lugs being bolted to the ring. The plane of the mounting lugs is, at least in all existing types, rearward of the center of gravity of the engine. Thus, vibration of the engine and particularly torsional vibration of the engine, which acts through the center of gravity, is magnified in its amplitude when transmitted to the rearwardly located engine mount structure. With engines of increased horse power, the tendency toward vibration increases—particularly the tendency toward torsional vibration. This results in a tendency for the engine to wobble on its mount and vibrations are transmitted from the engine to the mount and thence to the fuselage and other parts of the airplane in magnified degree. A concurrent evil with this type of mounting is that the engine may wobble rotationally whereby the crankshaft tends to describe a more or less conical path, which sets up high stresses in the propeller due to the tendency for the wobbling shaft to cause the propeller to rotate away from its normal rotational plane. These stresses are quite conceivably the cause of rapid fatigue and failure in certain of the engine and propeller parts. In the past, attempts have been made to damp these vibrational tendencies by the interposition of resilient cushioning means between the engine crankcase and the mounting structure.

These have been successful in some degree to reduce the intensity of the vibration, but they have not really cured the difficulty, since the plane of joinder of the engine to the mount has been spaced a substantial distance from the plane of the engine center of gravity.

My invention provides means for mounting the engines in the plane of its center of gravity. For instance, in aircraft engines of the radial aircooled type, the engine center of gravity is usually slightly rearward of the common plane of the cylinders. I provide mounting lugs between the engine cylinders in the plane of the center of gravity, and the skeleton mounting structure extends from the aircraft body to these lugs. The lugs may be formed as an integral part of the engine casing, or may be bolted on to existing types of engines so that the benefits flowing from this invention may be realized without completely changing the crankcase design, which would be an expensive undertaking.

I also provide cushioning means at the point of joinder of the mounting lugs with the engine mount, so that the engine may oscillate or vibrate torsionally in a plane normal to the crankshaft axis. This, the main source of vibration, is directly damped at the engine mount and wobbling tendencies with their resultant gyroscopic and other peculiar forces are prevented from building up since the engine is mounted in the plane of the center of gravity thereof. The mounting lugs and points of support for the engine are plural in number and are all substantially equidistantly spaced from the center of gravity. Thus, each point of mounting assumes loads substantially equal to the loads assumed at every other mounting point, regardless of the attitude of the aircraft and regardless of the thrust forces or other forces imposed by the engine. The mounting structure in itself is inherently rigid and braced by virtue of a light, strong triangulated series of tubes.

In the case of some engines, the intake manifold pipes extend from the rear portion of the crankcase tangentially outward to the heads of the several cylinders. Should the manifolds interfere with any one or more of the tubes of the engine mount structure, such tubes may be interrupted and braced around the manifold by means of gussets. Should this be done, a substantial clearance is allowed between the opening in the mount structure and the manifold pipe in order that movement of the engine due to torsional vibration may be unimpeded by the mounting structure.

The mounting lugs on the engine may be so formed that adjustments may be made longitudinally to compensate for changes in weight of engine accessories. For instance, the normal type of fixed pitch metal propeller weighs considerably less than propellers of the controllable pitch type. Since the propeller forms a part of the unit power plant and since its weight must be considered in conjunction therewith, the engine may be shifted forwardly and rearwardly by means of the adjusting mechanism so that the mounting plane is always coincident with the joint center of gravity of the engine, the propeller and other accessories rigidly mounted to the engine per se.

Objects of the invention are (a) to provide a mount for an aircraft power plant wherein the mounting plane passes through the center of gravity of the power plant; (b) to provide an engine mount wherein the engine is resiliently free to move torsionally but is rigidly held in other planes; (c) to provide means for mounting the engine so that all supporting lugs will assume equal stresses under all load conditions; and (d) to provide an inherently braced mounting structure forming part of the aircraft, to which an engine may be mounted in a plane including the power plant center of gravity.

It is to be understood in the specification and claims that the term "power plant" refers to the engine with its accessories and propeller, whereas the term "engine" refers to the engine alone.

For a better understanding of the details of this invention, reference may be made to the claims and to the following description, in which similar numbers indicate similar parts, and in which:

Figure 1:
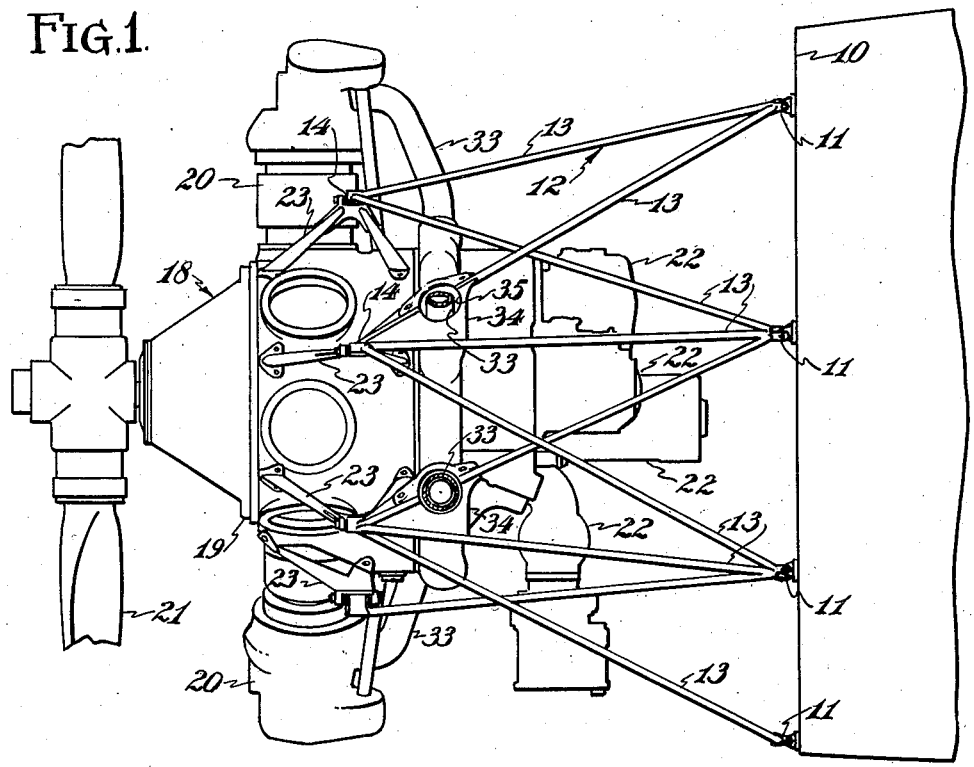
Fig. 1 is a side elevation of a power plant including an engine of the radial cylinder type, mounted on the forward end of an aircraft fuselage.
Figure 2:
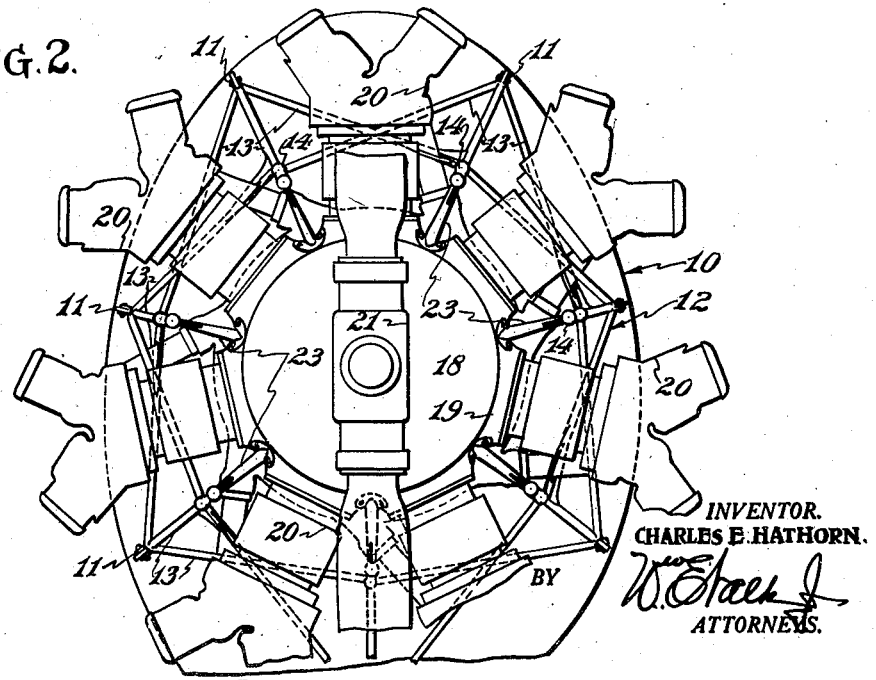
Fig. 2 is a front elevation of the power plant and its mounting on the aircraft fuselage.
Figure 3:
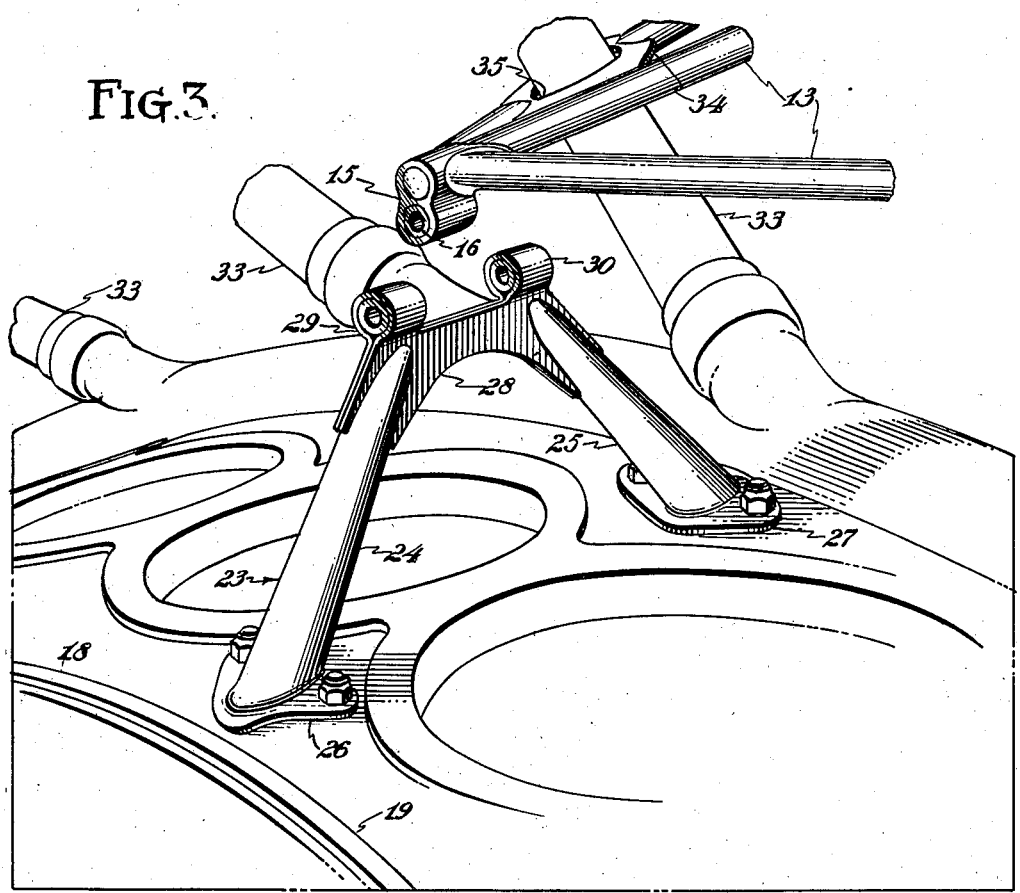
Figure 4:
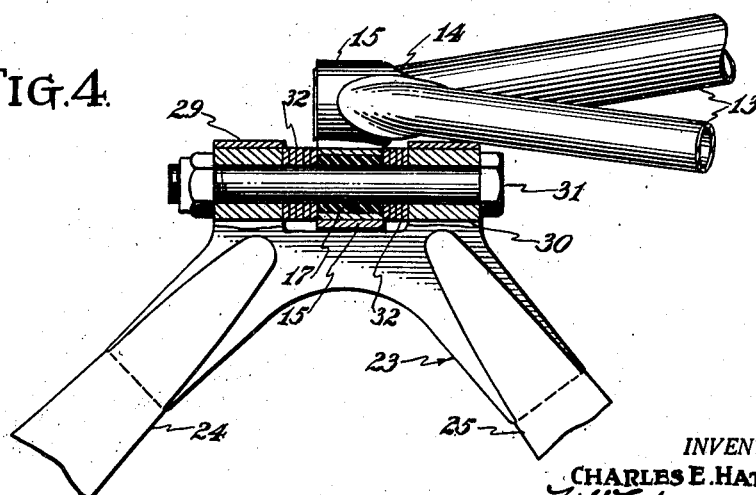

Fig. 3 is a perspective view of a portion of the engine crankcase, with cylinders removed, showing the detailed construction involved in joining the engine to the engine mounting structure; and Fig. 4 is a side elevation partly in section, showing the details of attachment of the engine mounting lug to the engine mounting structure, including means for adjusting the power plant forwardly and rearwardly on the mount to compensate for changes in the position of the center of gravity thereof.

At the forward end of the aircraft fuselage 10 a series of attachment fittings 11 serve to hold an engine mounting structure 12, this structure comprising a plurality of tubes 13 or the like extending forwardly to a plurality of apices 14. It will be noted that from three consecutive fittings 11, three tubes 13 extend forwardly to join at an apex 14. An adjacent group of three fittings 11 likewise carry three tubes joining at an adjacent apex 14, so that each apex 14 is rigidly supported by three tubes 13 forming a rigid triangulated structure. The apex 14 comprises a fitting 15 better shown in Figs. 3 and 4, this fitting having a longitudinally drilled opening 16 within which a rubber bushing 17 may be slipped. A power plant 18 includes the engine crankcase 19 having cylinders 20 radially extending therefrom, a propeller 21 mounted at the forward end of the engine shaft, and a plurality of engine accessories 22, including carburetor, magnetos, generator, starter and the like. Between each pair of adjacent cylinders 20, a mounting lug 23 is arranged. This lug comprises a pair of short struts 24 and 25 attached respectively to the forward and rearward portions of the crankcase as at 26 and 27. The struts converge at their upper ends, to be joined by a gusset 28 carrying a pair of bushed, spaced lugs 29 and 30 having aligned bores. The fitting 15 is adapted to be located between the lugs 29 and 30, and a bolt 31 may be inserted through the several aligned bores. Since the spacing between the lugs 29 and 30 is somewhat greater than the length of the fitting 15, the difference is made up by the insertion of a plurality of washers 32 on either end of the fitting 15. Certain of the washers may be shifted from in front of the fitting 15 to in back of the fitting 15 whereby the position of the power plant is slightly shifted forwardly and rearwardly with respect to the fitting 15. This enables adjustment of the position of the power plant longitudinally to compensate for differences in center of gravity location thereof which would be caused by variation in the weight of the propeller 21 or of a greater or lesser number of accessories 22 on the engine. As previously noted, the engine may be equipped with either a fixed pitch or controllable pitch propeller which would effect a change in the weight of the power plant, thus necessitating a shifting in the washers 32 to bring the center of each fitting 15 coincident with a plane through the center of gravity of the engine. Each of the mounting lugs 23 may be made substantially identical, and each is so organized that a plane through the fittings 15 not only passes through the center of gravity of the engine but is substantially normal to the engine shaft. The engine center of gravity usually lies coincident with or very close to the center of the engine shaft, so that the height of each lug from the casing may ordinarily be substantially the same.

It will thus be seen that a plurality of mounting points are provided, each of which lies in the plane of the power plant center of gravity, and also, all lie substantially equidistant from the center of gravity. Thus, when the power plant is in operation, and when the aircraft is in flight, regardless of the power developed by the engine or regardless of the airplane attitude, the stress imposed on each power plant mounting point is equal to the stress on each other mounting point.

It will readily be appreciated that the lugs 23 need not necessarily be separately attached, as shown, to the engine crankcase, but may be formed as an integral part thereof. In engines of the type depicted, intake manifolds 33 extend substantially tangentially from the engine casing 19 to the outer ends of the cylinders 20. It is quite possible that these manifolds might be so located that they would intersect one or more of the tubes 13 of the engine mount 12. To overcome such a difficulty, it is simply necessary to insert gussets 34 at the point where the manifold intersects, the gussets being provided with openings 35 through which the manifolds 33 may pass. Such openings would be of a diameter greater than the diameter of the manifold, so that slight movement of the engine with respect to the mounting structure will not cause the manifolds to touch the mount.

The rubber bushings 17 permit the engine to oscillate or vibrate in a plane parallel to the plane of the propeller and normal to the plane of the engine shaft, and also serve to absorb sudden torsional stresses between the engine and mount.

The engine is, however, rigidly restrained against forward or rearward movement or wobbling with respect to the mount by the inter-engagement of the lugs 29 and 30, the fittings 15 and the washers 32. Since all stresses from the engine are transmitted to the mount in the plane of the center of gravity of the power plant, it is impossible for such stresses to become magnified in their transmission to the aircraft body, whereby a very much smoother engine installation should accrue. Failures of engine mounts should be minimized, since all the stresses in this engine mount are quite determinate, whereas the stresses in engine mounts of prior construction were somewhat indeterminate. Although designed to take care of all conceivable loads imposed thereon, such mounts have frequently been known to fail, with possible loss of life or damage to the aircraft. Such indeterminate loading accrued from the offset relationship of the engine mounting plane to the power plant center of gravity, making it extremely difficult to precisely analyze secondary forces imposed on the structure. It was simple enough to determine the stress in the structure due to the weight of the engine, the torsional load, the thrust, and the weight of the engine when the aircraft might be in inverted flight or the like. In the mount of this invention such primary stresses would be the only stresses imposed upon the mount, and would all be clearly determinate. From the standpoint of engine design, too, this invention will simplify the analysis of stresses on the crankcase and the engine mounting lugs.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In a mounting for air aircraft power plant, said power plant including an engine and accessories mounted thereon, a mounting structure, means for mounting said power plant to said structure in a plane passing through the center of gravity of said power plant, and adjustable means in said mounting means for compensating changes in location of the power plant center of gravity due to substitution of power plant accessories of varying weight.

2. In a mounting for an aircraft power plant, a mounting structure, bosses carried by said power plant all lying in a plane passing substantially through the power plant center of gravity, and means for attaching said bosses to said structure including adjustable devices for locating said bosses with respect to said structure so that the mounting plane coincides precisely with a plane through the power plant center of gravity.

3. In a mounting for an aircraft power plant, a plurality of substantially coplanar bifurcated mounting bosses on the power plant, the plane of said bosses being normal to the power plant axis, and substantially including the power plant center of gravity, a plurality of substantially coplanar fixed power plant mounting fittings, each adapted to loosely engage within one said bifurcated boss, and means for locating said fittings in substantially fixed relation to said bosses, said means being adjustable in a direction parallel to the power plant axis.

4. In a mounting for an aircraft power plant subject to changes in center of gravity location through a relatively small range, a first set of coplanar mounting lugs, the plane thereof being substantially at one extreme of the possible range of center of gravity change, a second set of coplanar lugs the plane thereof being substantially at one other extreme of the possible range of center of gravity change, said lugs being carried by the engine, a plurality of substantially coplanar mounting fittings lying between said sets of lugs, means attaching said fittings to said lugs, and means for shifting said fittings toward one or the other set of lugs.

5. In aircraft, a plurality of substantially coplanar mounting elements together defining the apices of a polygon, said apices together lying in a plane, a power plant having an engine casing, said casing lying within said polygon in such a manner that the power plant center of gravity lies substantially in said plane, mounting lugs on said casing each organized for engagement with one said apex, and means for adjusting the several lugs, with said casing, with respect to said apices, in a direction normal to said plane.

CHARLES E. HATHORN.